United States Patent
Chan et al.

[11] Patent Number: 5,852,561
[45] Date of Patent: Dec. 22, 1998

[54] SELECTIVE CONFIGURATION OF OPERATING PROGRAMS STORED IN AN APPLICATION SPECIFIC INTEGRATED CIRCUIT

[75] Inventors: Virginia M. Chan, Fountain Valley; Stephen C. Muller, San Diego; Douglas M. Berger, Mission Viejo; Chuong D. Nguyen, San Jose, all of Calif.

[73] Assignee: Rockwell Int'l. Corp., Newport Beach, Calif.

[21] Appl. No.: 568,840

[22] Filed: Dec. 7, 1995

[51] Int. Cl.$^6$ .............. G06F 9/445; G06F 9/46; G06F 15/177; G06F 13/14

[52] U.S. Cl. .......... 364/488; 395/651; 395/652; 395/830; 395/833; 395/732

[58] Field of Search ............... 364/488, 489, 364/578, 491; 395/800, 500, 200.06, 756, 837, 651, 652, 830, 833, 732, 800.43, 800.39; 379/67, 201, 355, 61; 380/10

[56] References Cited

U.S. PATENT DOCUMENTS

| | | | |
|---|---|---|---|
| 5,193,174 | 3/1993 | Bealkowski et al. | 395/500 |
| 5,243,700 | 9/1993 | Larsen et al. | 395/275 |
| 5,446,904 | 8/1995 | Belt et al. | 395/750 |
| 5,455,854 | 10/1995 | Dilts et al. | 379/201 |
| 5,535,406 | 7/1996 | Kolchinsky | 395/800 |
| 5,555,288 | 9/1996 | Wilson et al. | 379/67 |
| 5,590,305 | 12/1996 | Terrill et al. | 395/430 |
| 5,600,845 | 2/1997 | Gilson | 395/800 |
| 5,606,597 | 2/1997 | Newland | 379/61 |
| 5,606,715 | 2/1997 | Yishay et al. | 395/800 |
| 5,652,844 | 7/1997 | Harwood, III | 395/284 |

*Primary Examiner*—Emanuel Todd Voeltz
*Assistant Examiner*—Phallaka Kik
*Attorney, Agent, or Firm*—James P. O'Shaughnessy; William C. Cray

[57] ABSTRACT

A method for configuring a program-controlled integrated circuit which contains default configuration data and includes input/output lines connectable to at least one external source of configuration data, the method including: a) determining whether an external source of configuration data is connected to the input/output lines; b) in response to a determination that an external source of configuration data is connected to the input/output lines, configuring the integrated circuit in accordance with that configuration data from that source; and c) in response to a determination that an external source of configuration data is not connected to the input/output lines, configuring the integrated circuit in accordance with the default configuration data. An application specific integrated circuit containing circuit units which must be configured in accordance with configuration data, the circuit including: external connection lines for connecting the circuit to an external source of configuration data; a first non-volatile memory portion storing default configuration data; and a second non-volatile memory portion storing a control program which is operative for selecting configuration data from among configuration data stored in a connected external source connected to the external connection lines and the stored default configuration data.

14 Claims, 1 Drawing Sheet

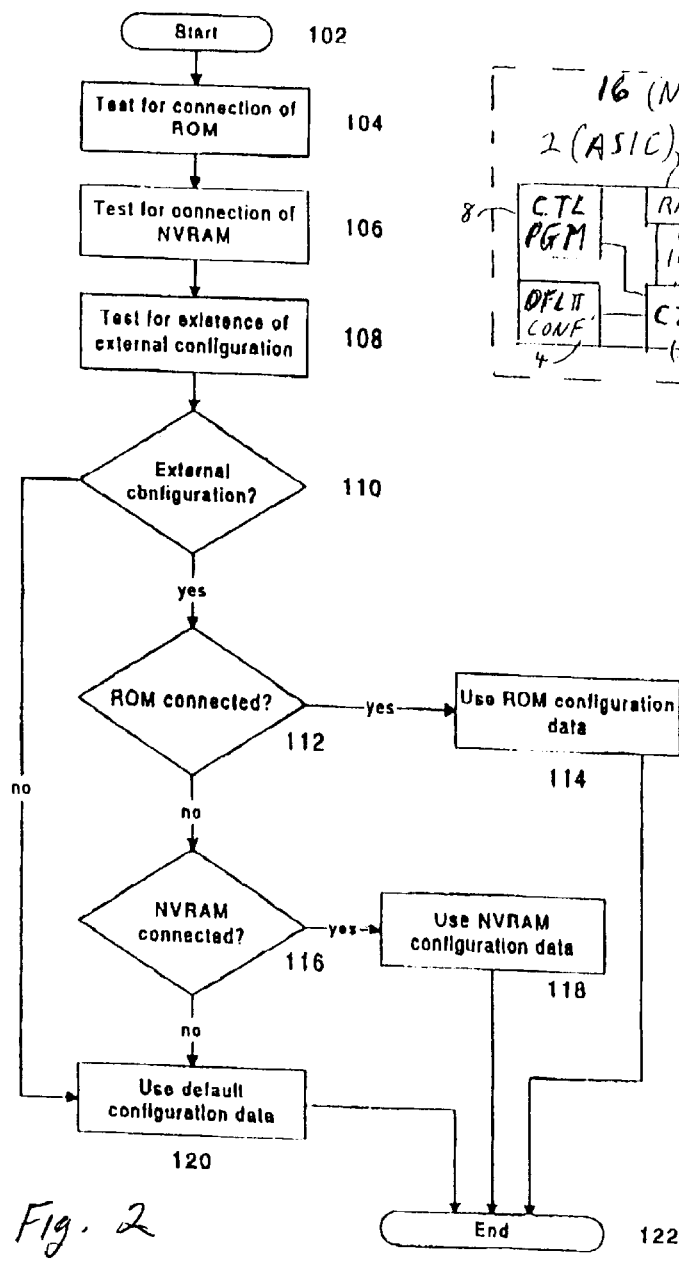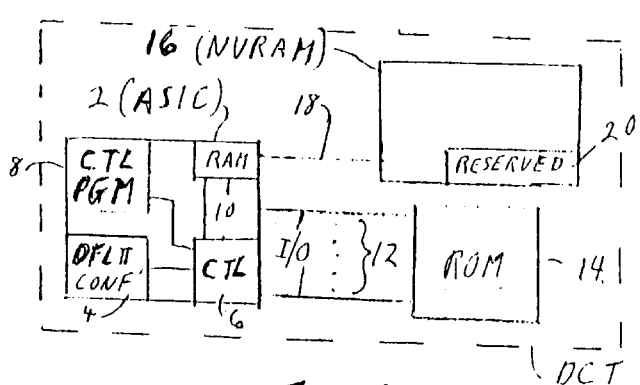
Fig. 1
Fig. 2

SELECTIVE CONFIGURATION OF OPERATING PROGRAMS STORED IN AN APPLICATION SPECIFIC INTEGRATED CIRCUIT

BACKGROUND OF THE INVENTION

The present invention relates to program controlled systems which are capable of having different operating configurations and which can be configured on the basis of configuration data stored in an optional memory.

Configuration data includes information identifying the types of components in the system, the manner in which the components are to communicate with one another, etc. Such data can be permanently stored in the system, for example in a built-in programmable read-only memory (PROM).

One example of such a system is a digital cordless telephone (DCT). Many DCTs include an application specific integrated circuit (ASIC) which may contain, for example, a modem, a telephone controller, an audio engine and a memory storing data that provides a protocol for a digital link between the telephone handset and base station. The ASIC may additionally contain other circuitry. The telephone controller controls the basic telephone functions, such as the keyboard, LCD, radio, on/off hook switch, ring detection, low battery detection, listen/talk switching, speaker phone control, etc. The audio engine comprises conventional circuitry for voice coding and tone generation and for generating speech from digital data. A more general term for the audio engine might be "ADPCM voice encoder/decoder and tone generator".

A single type of ASIC may be manufactured for sale to a number of different DCT manufacturers, and each of these manufacturers may wish to give their products distinctive capabilities. Frequently a DCT must be customized to function with specific external hardware. For example, one DCT manufacturer may want their product to function using an off key separate from a Phone key, while another may want these functions combined into a single toggle Talk key. Another example is that the microphone gain must be different for different microphones that manufacturers might use. Even without hardware differences, a manufacturer may wish to alter the tones, LED indications, and other user features to differentiate its products from those of its competitors. Another reason to customize a DCT ASIC is to allow for product variation. For example, a DCT manufacturer may wish to include or exclude options such as speakerphone and caller ID in different versions of its products.

However, it would not be economically feasible for an ASIC manufacturer to design a different ASIC for each DCT fabricator or each DCT model. For this reason, it is known to give a single ASIC type a desired configuration either by permanently connecting one or more selected input lines to be at a high or low potential, or by connecting address and data lines to an external ROM containing appropriate configuration data. The first method requires the addition of a dedicated pin for every possible configuration option. The second method, while allowing for customization by the OEM, requires the inclusion of an external ROM for even the most minor customization. Both of these methods ultimately add to the cost of the product.

SUMMARY OF THE INVENTION

It is an object of this invention to expand the configuration possibilities for a given ASIC in a program controlled system.

Another object of the invention is to provide an ASIC which can identify the desired source of configuration data.

A further object of the invention is to provide configuration data in a non-volatile RAM that is present in the system to perform other functions.

Another object of the invention is to provide an ASIC which system manufacturers can easily configure in a variety of ways.

The above and other objects are achieved, according to the invention, by a method for configuring a program-controlled integrated circuit which contains default configuration data and includes input/output means connectable to at least one external source of configuration data, the method comprising: a) determining whether an external source of configuration data is connected to the input/output means; b) in response to a determination that an external source of configuration data is connected to the input/output means, configuring the integrated circuit in accordance with that configuration data from that source; and c) in response to a determination that an external source of configuration data is not connected to the input/output means, configuring the integrated circuit in accordance with the default configuration data.

Objects according to the invention are further achieved by an application specific integrated circuit containing circuit units which must be configured in accordance with configuration data, the circuit comprising: external connection means for connecting the circuit to an external source of configuration data; a first non-volatile memory portion storing default configuration data; and a second non-volatile memory portion storing a control program which is operative for selecting configuration data from among configuration data stored in a connected external source connected to the external connection means and the stored default configuration data.

BRIEF DESCRIPTION OF THE DRAWING

FIG. 1 is a block diagram illustrating an embodiment of the present invention.

FIG. 2 is a programming flow diagram of a configuration selection operation according to the invention.

DESCRIPTION OF THE PREFERRED EMBODIMENTS

FIG. 1 illustrates a system including an ASIC 2 installed, by way of example, in a DCT. ASIC 2 is constructed to include a number of components for the DCT, as described earlier herein. ASIC 2 includes a memory having a portion 4 which is factory programmed to store a default configuration on which operation of ASIC 2 will be based if ASIC 2 is not connected to receive configuration data from any component external thereto.

ASIC 2 further includes a conventional controller 6 and, according to the invention, a memory region 8 storing a control code, or control program, the operation of which will be described below.

ASIC 2 is further provided with a RAM 10 and a plurality, for example 8, of input/output (I/O) lines 12 via which the default configuration stored in memory region 4 can be modified or replaced.

According to a first possibility for modifying or replacing the default configuration, one or more of the I/O lines 12 can be physically tied to always be at a high or low potential, representing a specific bit value. The potentials on these lines will, in effect, override corresponding values associated with the default configuration. This technique is already known in the art.

According to an alternative approach that is also already known in the art, the I/O lines 12 can be connected to a ROM 14 which is configured to provide the desired configuration data. If ASIC 2 is constructed to receive configuration data from a ROM 14, the possibility exists of eliminating the ROM 14 and tying appropriate I/O lines high or low, as described above.

Furthermore, another possibility for supplying configuration data to ASIC 2 according to the present invention is based on the use of a portion of a memory of a non-volatile RAM 16, which can be in the form of an EEPROM that may be added to the DCT by the telephone manufacturer. Typically, a NVRAM is added to store telephone numbers in order to permit memory dialing. NVRAM 16 is connected to ASIC 2 via a separate I/O line 18.

As a general rule, available NVRAMs have more data storage capability than is required for memory dialing. According to the present invention, a portion 20 of the data storage area in NVRAM 16 is reserved for storage of configuration data.

A suitable protocol is provided to extract that data from area 20 when an NVRAM 16 containing such data is connected in the DCT. The configuration data is transferred from NVRAM 16 to the ASIC 2 via the same serial input/output line 18 already in place to transfer stored phone numbers. Typically, in this situation, ROM 14 would not be provided.

Thus, briefly stated, according to the present invention, configuration of ASIC 2 can be controlled either on the basis of default configuration data stored in memory region 4, or by tying appropriate ones of the 8 I/O lines 12 high or low, in which cases it would not be necessary for the DCT to be provided with either ROM 14 or NVRAM 16, or on the basis of data stored in ROM 14, in which case NVRAM 16 is not needed for configuration purposes, or on the basis of configuration data stored in the reserved area 20 of NVRAM 16, in which case ROM 14 need not be provided.

A dedicated one of the plurality of I/O lines 12 is interrogated to determine whether external configuration is present, either in a ROM 14 or in an NVRAM 16. If no ROM 14 is connected, and if external configuration beyond the degree provided by the plurality of I/O lines 12 is desired, it is necessary that this one dedicated line be tied to a low potential to indicate the existence of an external configuration in NVRAM 16.

The control program stored in memory region 8 in ASIC 2 is provided in order to facilitate implementation of the configuration scheme selected by a DCT manufacturer when ASIC 2 is designed for use in DCTs made by a number of different manufacturers who wish to utilize different configuration schemes. The operation of the control program is depicted by the flow diagram shown in FIG. 2. After a DCT has been assembled, power can be applied to ASIC 2 to start the configuration operation, as represented by the block 102 in FIG. 2. Then, a dedicated external address, if present, is read from lines 12 and saved in RAM 10 for later reference. If no external ROM 14 exists, the data value read from the external address would be the result of all of the plurality of I/O lines being tied to high or low potential, and would be the same regardless of the address chosen. If an external ROM 14 exists, the corresponding value would be the contents of the dedicated address in external ROM 14.

Next, in step 104, a checksum is calculated over the address space of an expected external ROM 14. Any code and/or data residing in an external ROM would be required to have one or more bytes reserved, and have data values stored therein, such that this checksum test would pass. If the checksum test passes, the external ROM 14 is assumed to be present, otherwise, it is assumed to be absent. Any checksum algorithm which would meet these requirements can be used. An external ROM 14 may be present for configuration only, or for other reasons, such as, but not limited to, executable code in addition to, or in place of, the ASIC internal controller program 8, or for any combination of these reasons.

Next, a test is performed, in step 106, to determine whether an NVRAM 16 is connected to line 18. The presence of NVRAM 16 can be determined by writing data to selected locations of NVRAM 16 and then reading back the data stored in those locations. If the data read back is identical to the data that was written, this indicates that an NVRAM 16 is connected via line 18 to ASIC 2. A non-volatile RAM may be present for configuration only, or for other reasons, such as, but not limited to, the storage of phone numbers, or for any combination of these reasons.

A selected potential on the dedicated one of the plurality of I/O lines 12 indicates whether an external configuration is present. The remaining I/O lines 12 provide additional configuration apart from the optional external configuration that may exist in a ROM 14 or in an NVRAM 16. This dedicated line, or the copy previously read and stored in RAM 10, is tested in step 108. If an external configuration is present in ROM 14 or NVRAM 16, the one dedicated line will be either physically connected to be at a selected potential, for example a low potential or ground, or the corresponding bit is the data value read from the dedicated address in ROM 14 will be set to that same selected binary value, for example 0. The external configuration can be provided by configuration data in a connected ROM 14 or in a connected NVRAM 16, or may not be present at all, in which latter case only the minimal configuration provided by connecting each of the other seven I/O lines 12 to a high (binary 1) or low (binary 0) potential is used.

If this dedicated I/O line indicates that an external configuration is present (step 110), and if the checksum test indicates that an external ROM 14 is present (step 112), the ASIC 2 performs the configuration operation based on data stored in dedicated locations in ROM 14 (step 114).

If the determination in step 112 indicates that a ROM 14 is not connected, yet the dedicated I/O line indicates that external configuration is present, and if an NVRAM 16 is determined to be present (step 116), the NVRAM 16 is assumed to contain configuration data, and the configuration data stored in the reserved area 20 of NVRAM 16 is utilized for configuration purposes. If the result of step 116 is that no NVRAM is connected, or if the result of step 110 is that no external configuration data is present, the default configuration stored in memory area 4 of ASIC 2 is employed for configuration purposes (step 120), and the configuration program ends at step 122.

If no ROM 14 or no NVRAM 16 containing configuration data is to be connected to ASIC 2, then the seven lines of I/O lines 12 other than the dedicated line must each be connected to a high potential or low potential. The configuration data thus provided by I/O lines 12 can be added to supplemental configuration data stored in memory 4.

Configuration of a DCT occurs in its base station. After the base station has been configured, necessary data can be communicated to a memory in the associated handset at the time when the handset is physically connected to the base station via a serial link between contacts on the base station and contacts on the handset. Alternatively, the handset may contain its own external configuration, independent of the external configuration contained on the base station, and once having been thus configured, would thereafter ignore the configuration data provided to it by the base.

While the invention has been described with reference to a DCT, it should be appreciated that it could be applied to other program controlled devices which are constructed to have their operation controlled by data stored in a connected ROM. Such devices would be those that include an external data bus which is connected to read data from an external ROM.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for configuring an application specific program-controlled integrated circuit which contains default configuration data and includes input/output means connectable to a plurality of external sources of configuration data, said method comprising:

a) testing for connection of a first external memory to said application specific integrated circuit;
    b) testing for connection of a second external memory to said application specific integrated circuit;
    c) determining whether an external source of configuration data is connected to said input/output means;
    d) in response to a determination that an external source of configuration data is connected to the input/output means, locating the externally stored configuration data;
    e) configuring the application specific integrated circuit in accordance with the externally located configuration data;
    f) in response to a determination that an external source of configuration data is not connected to the input/output means, configuring the integrated circuit in accordance with the default configuration data stored in said application specific integrated circuit.

2. The method of claim 1 wherein the step of locating the externally stored configuration data comprises:

determining whether a first external memory is connected to the input/output means;
    in response to a determination that a first memory is connected to the input/output means, configuring the application specific integrated circuit in accordance with configuration data from the first memory;
    in response to a determination that a first memory is not connected to the input/output means, determining whether a second memory is connected to the input/output means; and
    in response to a determination that a second memory is connected to the input/output means, configuring the integrated circuit in accordance with configuration data from the second memory.

3. The method of claim 2 wherein the step of testing for connection of a first external memory comprises a checksum calculation.

4. The method of claim 3 wherein the step of testing for connection of a second external memory comprises a read/write operation.

5. An application specific integrated circuit including a controller and controller memory for storing controller programming, said circuit comprising:

external connection means capable of connecting said application specific integrated circuit to a plurality of external storage means;
    a default configuration memory connected to said controller for storing default configuration data; and
    said controller memory storing a program operative to determine whether external storage means are connected to said external connection means, retrieve configuration data that may be stored in said external storage means, and retrieve configuration data from said default configuration memory if no configuration data is stored externally.

6. The application specific integrated circuit of claim 5 wherein said external storage means is a non-volatile RAM having a main memory area and a reserved memory area, the reserved memory area storing the configuration data.

7. The application specific integrated circuit of claim 6 further comprising:

a digital cordless telephone, said application specific integrated circuit located in the digital cordless telephone; and
    wherein said non-volatile RAM, located in the digital cordless telephone, stores telephone number data in the main memory area to support automatic calling.

8. A method for configuring a program-controlled integrated circuit which contains default configuration data and includes input/output circuit connectable to a plurality of external sources of configuration data, said method comprising:

a) testing for connection of a first external memory to said program-controlled integrated circuit;
    b) testing for connection of a second external memory to said program-controlled integrated circuit;
    c) determining whether an external source of configuration data is connected to said input/output;
    d) in response to a determination that an external source of configuration data is connected to the input/output circuit, locating the externally stored configuration data;
    (e) configuring the program-controlled integrated circuit in accordance with the externally located configuration data; and
    (f) in response to a determination that an external source of configuration data is not connected to the input/output circuit, configuring the program-controlled integrated circuit in accordance with the default configuration data stored in said program-controlled integrated circuit.

9. The method of claim 8 wherein the step of locating the externally stored configuration data comprises:

determining whether a first external memory is connected to the input/output circuit;
    in response to a determination that a first memory is connected to the input/output circuit, configuring the program-controlled integrated circuit in accordance with configuration data from the first memory;

in response to a determination that a first memory is not connected to the input/output circuit, determining whether a second memory is connected to the input/output circuit, and in response to a determination that a second memory is connected to the input/output circuit, configuring the program-controlled integrated circuit in accordance with configuration data from the second memory.

10. The method of claim 9 wherein the step of testing for connection of a first external memory comprises a checksum calculation.

11. The method of claim 10 wherein the step of testing for connection of a second external memory comprises a read/write operation.

12. An integrated circuit including a controller and controller memory for storing controller programming, said circuit comprising:

an external connection capable of connecting said integrated circuit to a plurality of external storage means;

a default configuration memory connected to said controller for storing default configuration data; and said controller memory storing a program operative to determine whether external storage means are connected to said external connection, retrieve configuration data that may be stored in said external storage means, and retrieve configuration data from said default configuration memory if no configuration data is stored externally.

13. The integrated circuit of claim 12 wherein said external storage means is a non-volatile RAM having a main memory area and a reserved memory area, the reserved memory area storing the configuration data.

14. The integrated circuit of claim 13 further comprising:

a digital cordless telephone, said integrated circuit located in the digital cordless telephone; and wherein said non-volatile RAM, located in the digital cordless telephone, stores telephone number data in the main memory area to support automatic calling.

* * * * *